UNITED STATES PATENT OFFICE.

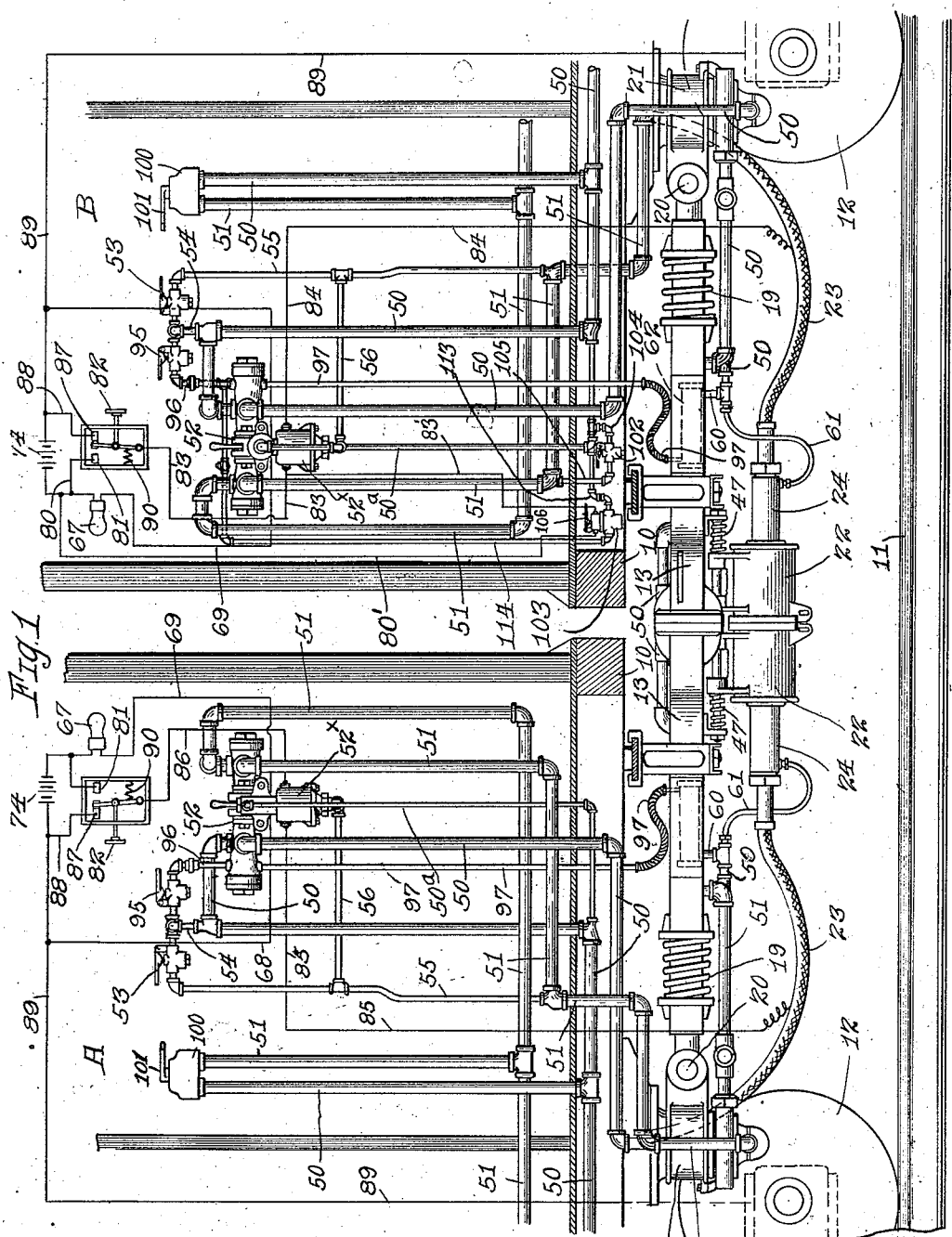

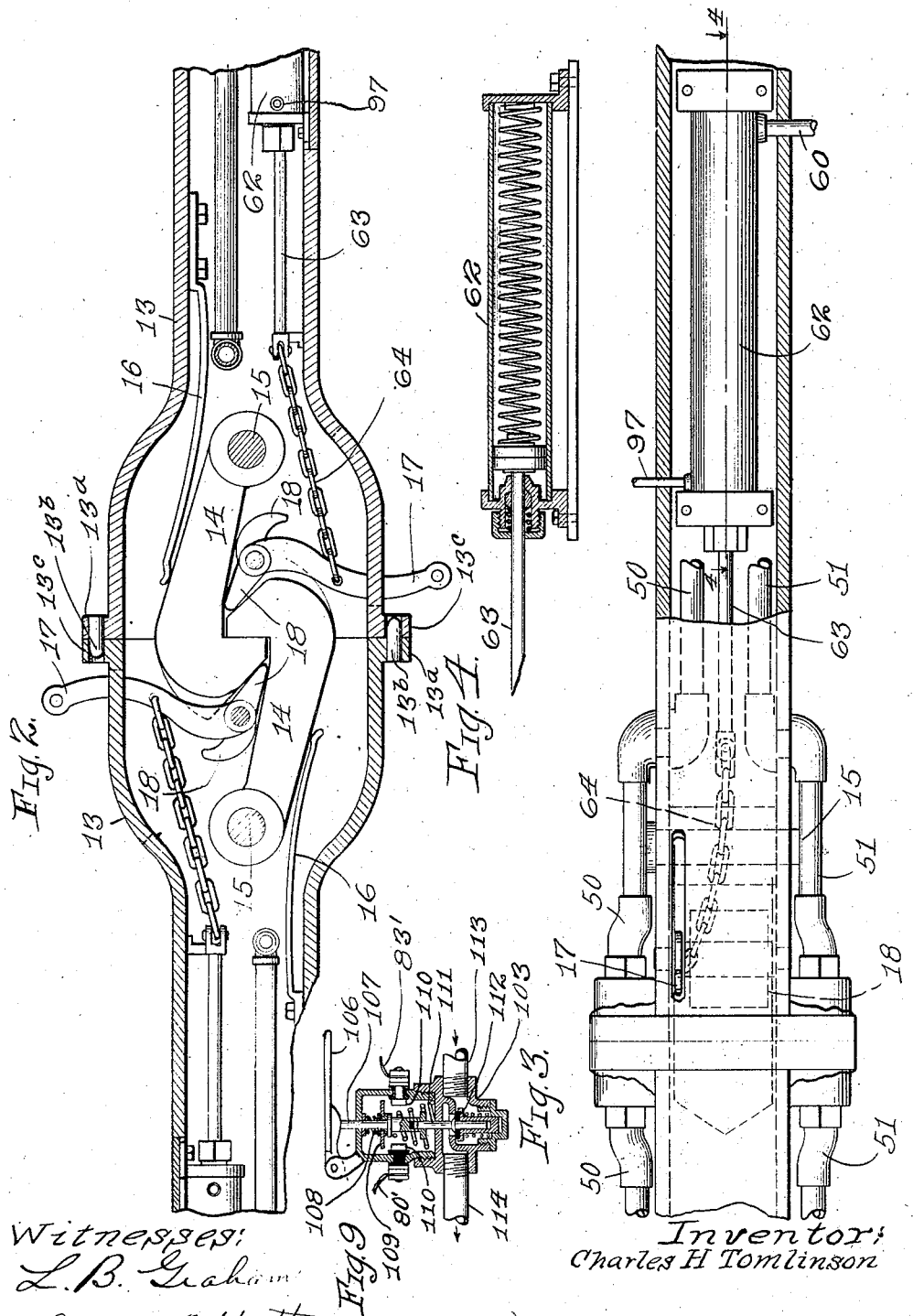

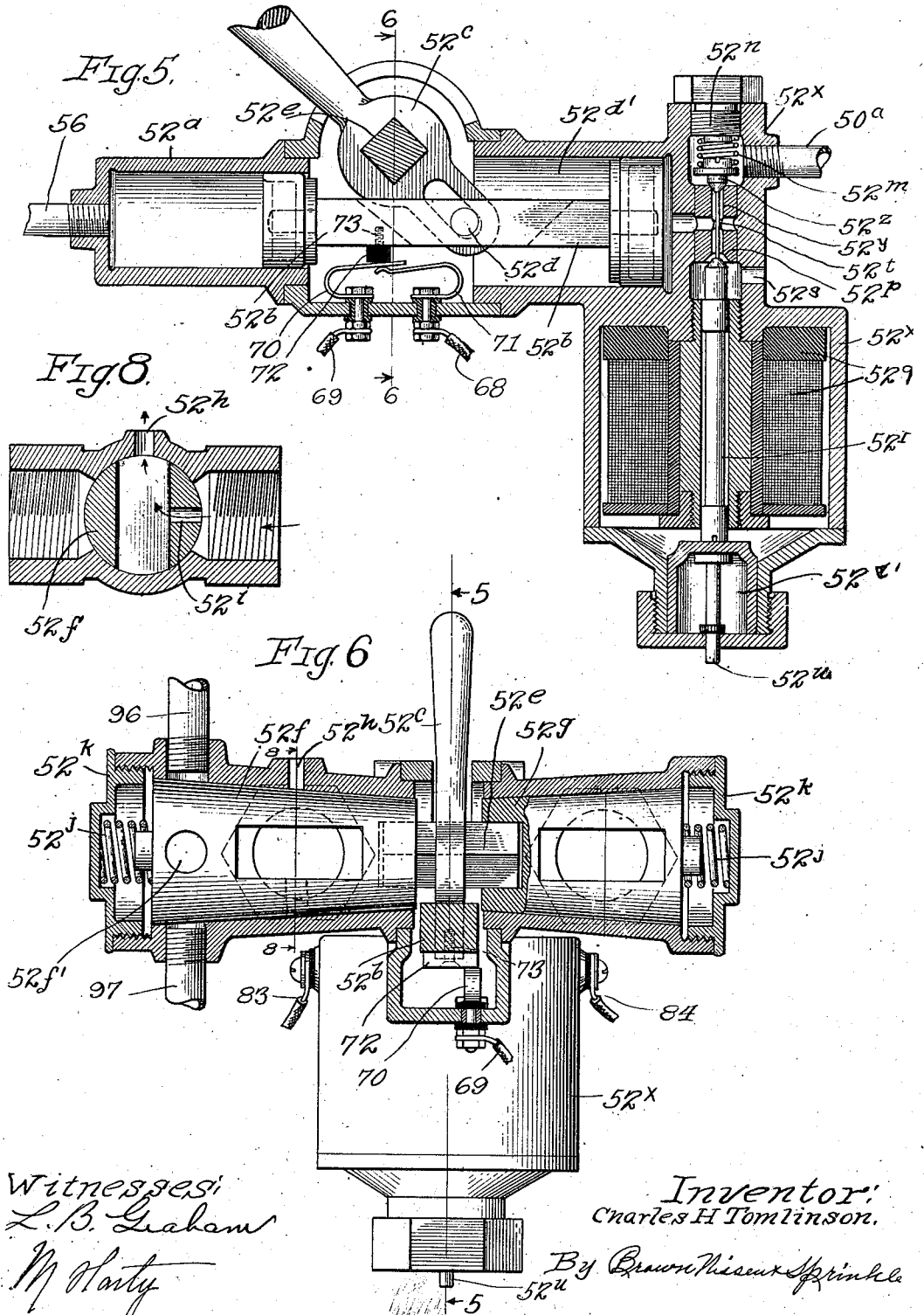

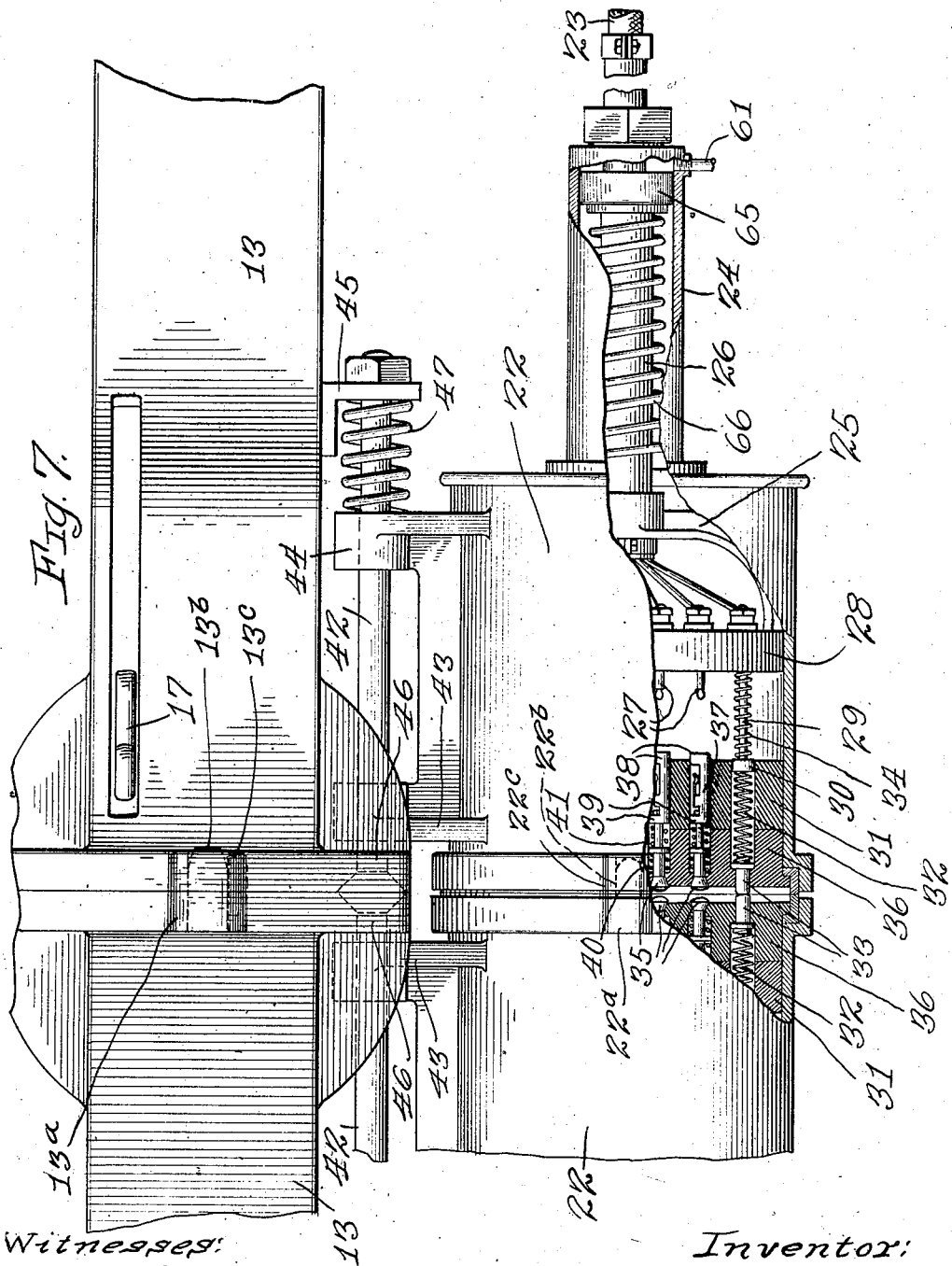

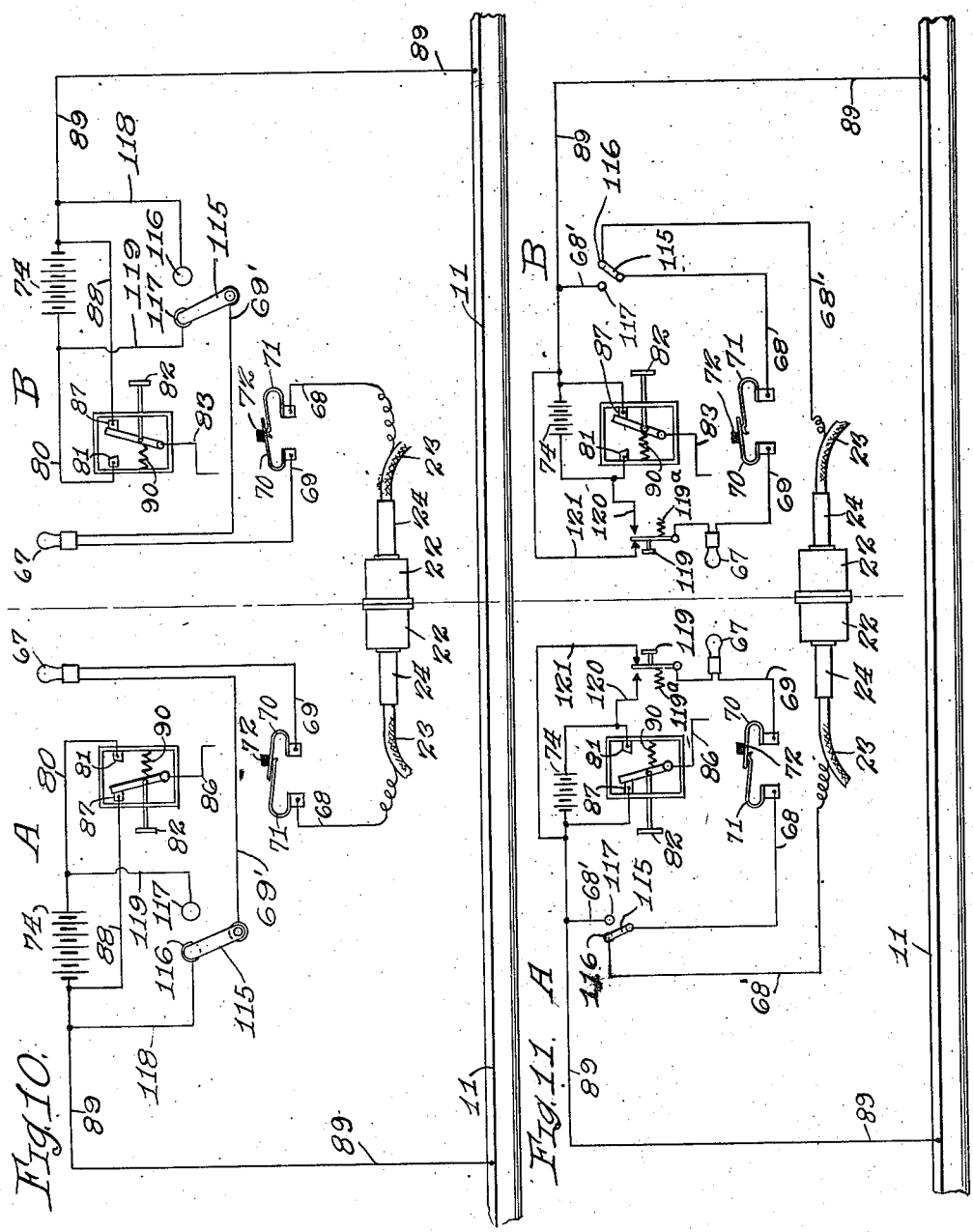

CHARLES H. TOMLINSON, OF MANSFIELD, OHIO.

AUTOMATIC CAR, AIR, AND ELECTRIC COUPLING MECHANISM.

1,223,223.  Specification of Letters Patent.  Patented Apr. 17, 1917.

Application filed March 6, 1914. Serial No. 822,802.

*To all whom it may concern:*

Be it known that I, CHARLES H. TOMLINSON, a citizen of the United States, residing at Mansfield, in the county of Richland and State of Ohio, have invented certain new and useful Improvements in Automatic Car, Air, and Electric Coupling Mechanisms, of which the following is a specification.

The invention relates to an improved car coupling system designed to be automatically operated in so far as the mechanical car coupling device is concerned, and the usual air and electric systems are also automatically coupled at the same time, with the exception of the operation of certain valves or switches which may be manipulated by a trainman in the cab of one of the cars or from the ground adjacent either car.

The primary object of the invention is to construct a system of coupling devices for mechanically connecting cars as well as connecting the electrical and the air systems, which shall be as nearly automatic as possible, and at the same time be under the control of the trainman without leaving his cab or station on one of the cars.

Other objects of the invention relate to various details of construction and arrangement of the parts which are shown in the drawings, described in the specification and more specifically referred to in the claims.

In the said drawings, Figure 1 is a side elevation of two coöperating coupling devices shown on cars, the adjacent ends of which are shown in side elevation with the car bodies in section disclosing in side elevation the coupling mechanism on the interior of the car body or trainman's cab, with the exception of the fluid and electrical connections, which are diagrammatically illustrated. In this view, broken portions of the track and car trucks also appear;

Fig. 2 is a horizontal section taken longitudinally through two adjacent car coupling devices, showing the construction of the car coupler for being operated automatically in both the coupling and uncoupling operations, while Fig. 3 is a side elevation of the same parts, a portion of one end of one of the couplers being in section to disclose the cylinder for operating the couplers in the uncoupling operation;

Fig. 4 is a section through the air cylinder for operating the couplers, being taken approximately on line 4—4 of Fig. 3, the view being in the direction of the arrows;

Fig. 5 is a sectional view through the main valve, showing the electrical, air and mechanical devices for operating same. This view is on line 5—5 of Fig. 6, which latter figure is a view taken approximately on line 6—6 of Fig. 5, showing a portion of the valve and its operating mechanism in section;

Fig. 7 is an enlarged view in side elevation of the car and electrical coupler mechanism, with a portion of the electric coupler mechanism in section in order to disclose the details of construction thereof;

Fig. 8 is a cross section through the main valve on line 8—8 of Fig. 6;

Fig. 9 is a sectional view of a combined air valve and electric switch for operating the coupler mechanism from the ground or track;

Figs. 10 and 11 are modifications of the electric signal apparatus for indicating the position of the main valves.

In Fig. 1 the general arrangement of the invention is best illustrated, and in this view and throughout the drawings like reference characters are used to designate like parts. As is well known in coupling mechanisms, these devices are employed on the ends of cars adapted to be coupled together in trains of two or more cars, and the successful operation of the device depends upon each of two or more cars being equipped with like or similar devices. Therefore in the assembled view of Fig. 1 and in some of the other drawings, portions of similar coupling devices on two contiguous cars are shown and this manner of showing the invention obviously results in a duplication of some of the parts, but it will be seen that the same reference characters are applied to the same parts although they appear as a part of systems in different cars, as, for example, the two portions of cars shown in Fig. 1, in which the ends of the cars are shown in section and portions thereof are designated generally by the reference character 10. In Fig. 1, a track is shown, the rails of which are designated by the reference character 11, and a portion of the truck wheels in each of the two cars is designated by the reference character 12. 13 designates generally the casings of the draft gears or coupling bars, which are preferably of the automatic type, as shown for example in my pending application for United States Letters Patent Serial No. 659,083, filed November 8, 1911. These car coupling devices are shown in longitudinal sectional view in Fig. 2, and in side elevation in Fig. 3. These coupler heads or draft devices are provided with the coupling devices or hooks 14 pivoted in the coupler heads at 15, and are provided with engaging portions as shown, so that when two of these coupler heads are in engagement the coupling devices may be interlocked, as shown for example in Fig. 2, to couple the cars together. In a car coupling device of this type, it may be arranged to be automatic in the coupling operation and hand-operated or operated by any desired mechanical means for the uncoupling operation. In the embodiment of the coupling device in my application Serial No. 659,083, referred to, the device is automatic in the coupling operation, since the coupling devices 14 are normally held in engaging or interlocking position when the coupler heads are brought together by the elastic members or springs 16. In the present embodiment of the invention, the uncoupling operation is also made automatic by the provision of means to be described for automatically operating the cam levers 17, which corresponding levers in my prior application referred to were adapted to be operated only by hand for uncoupling. The cam members which effect this separation of the engaging coupler hooks 14 are designated by the reference character 18, Fig. 2. The coupler heads or draft gears 13 are swiveled to the under side of the car bodies in the usual or any desired manner to allow them to have the desired flexibility necessary in car couplings, due to curves and irregularities in tracks, and in the embodiment of the draft gears shown they are cushioned by suitable springs, as indicated at 19, and are shown in swiveled connection with the under side of the car body at 20 and 21, respectively, thus giving them the universal movement. It will be sufficient to state that in the pivotal connection 21 of the coupling device with the car, provision is made for passing fluid pipes from the car into the coupling devices. These fluid pipes are the usual reservoir line and brake line pipes for operating the air brakes, and in the same manner pressure pipes for operating the electrical coupling devices may be brought in proximity to the car couplers and supported thereby in the manner to be hereinafter described.

In addition to providing suitable connections adjacent the car coupling devices for operating the brakes, I provide means for connecting any desired number of electrical circuits between the cars. These connecting devices or couplers are brought into the coupling relation by being contained in suitable casings 22. In Fig. 7 is shown an enlarged detail of such portions of these electrical coupling devices as are necessary to understand its operation, and for further details reference may be had to my application for United States Letters Patent Serial No. 815,339, filed January 30, 1914, on the electrical multiple circuit connector.

In order to understand the operation of the entire mechanism, it should be noted that whatever electric circuits are desired between the two cars will be collected into the flexible conduits or cables 23 which pass into the cylinders 24 in line with and connected to the electrical terminal casings 22. Within the casings 22 are reciprocating heads 25 secured to the hollow sleeves 26, which extend outwardly through the casings 24 to the exterior thereof, where they are clamped around the electric circuit cables 23. After passing through the reciprocating heads 25, the wires of the electric cables 23 separate and each terminates in suitable separate terminal plugs 27 mounted in an insulating head plate secured to the reciprocating heads 25, these insulating head plates being indicated at 28. In addition to the terminal plugs 27 in the insulating head plates 28, there may be terminal connections of another character, since the terminal plugs 27 are adapted to be connected and disconnected from the contacting plugs in the forward end of the electrical coupler casing. Such terminal connections are desirable under conditions more fully explained in my application last referred to, but briefly stated are for the purpose of enabling the contacts on the forward face of the electrical casings to be live connections at all times, regardless of the position of the reciprocating plunger 25, 28 carrying the terminal plugs 27. Such a live wire connection is illustrated by the terminal plug 29, the shank of which, it will be seen, projects forward much farther than the shanks of the plugs 27, so that it is in engagement at all times with the contacting thimble 30 in a recess in the insulating plate 31, which furnishes a support for all of the electrical contactors. The coiled metallic spring 32 extends from the thimble 30 to the contactor 33 exposed normally from the forward face of the casing and adapted to be at all times in circuit with its corresponding connection passing through the cable 23 to the car, since the coil spring 34 surrounding the shank 29 holds the thimble 30 in contact with the spring 32 and insures constant contact between these parts, all of which are conductors leading to the live contactor plug 33. These live contactors 33 are for certain secondary circuits, as signals, call bells and the like, which may be and preferably are live connections at all times and of a character such that objectionable arcing will not take place in the uncoupling or coupling operations. The terminal plugs 27, however, are designed for the heavier circuits and their corresponding contactors 35, while seated in the forward insulating plate 36 like the live contactors 33, are nevertheless adapted to be disconnected from the circuits during the coupling and uncoupling operations, since their connections with the terminal plugs 27 are obtained through the slidable connectors 37, which have spring sockets 38 for coöperating with the terminal plugs 27 and sliding connections at 39 with the shanks of the contactor plugs 35. The desired elastic connection between the connectors 37 and the contactor plugs 35 and the insulating plate 36 is secured by the coil springs 40 and 41, respectively. The electric coupling casings 22 may be secured to the car coupler heads 13 in any desired manner, although it is preferred that they be connected therewith to have a certain amount of lateral movement, as by the hinge pins or bolts 42 which pass through the lugs on the upper extremities of the casings and through corresponding projections or lugs on the draw bars or coupler heads 13. The lugs on the casings 22 are designated by 43, 44, and the corresponding lugs or projections on the coupler head by 45, 46. It is preferred that the electric coupler casing 22 be held in its normal forward position by suitable elastic means, as the coil spring 47 interposed between the lugs 44 and 45.

To refer now to the means provided in my system for controlling and operating the car and electric coupling devices, it should be noted that the system embodying the present invention is designed for use in coupling cars provided with the usual fluid brake systems. As is common in this art, in connection with each car coupler there are two fluid-pressure lines, one termed the reservoir line and the other the brake line, for the reason that one of these lines communicates between the reservoir or source of fluid pressure and the pressure-control devices, while the brake line extends from the pressure-control devices to the brake cylinders or other brake-operating devices. In describing my improved system, the same reference character on each of the cars shown in the various figures will be applied throughout to designate the reservoir line and the brake line respectively, 50 designating the reservoir line and 51 the brake line. Since the mechanism for mechanically operating the air brakes through the fluid-pressure lines forms no part of my invention, such mechanism is not shown but only the mechanism for controlling the fluid-pressure lines. 52 designates generally a main valve for turning on and off the pressure in the coupling operation and corresponds to the ordinary angle valves in train pipes, although the same is modified from the usual construction in the manner hereinafter set forth to accommodate it to use in my improved system. Since the arrangement of the fluid-control circuits is more or less diagrammatical, as shown particularly in Fig. 1, the construction of the devices may best be understood by a description of the mode of operation of the system in coupling and uncoupling the car, fluid and electric coupling devices. Assuming that it is desired to effect the mechanical coupling of the two cars, portions of which are illustrated in Fig. 1 and throughout the several views, the trainman or operator would take his position in the cab of either one or the other of the cars, and would by the use of some suitable mode of power not herein shown cause that car to be brought into coupling relation with the other car, so that the coupling devices might physically coöperate in the manner indicated in the drawings, and particularly in Fig. 1. It will be understood that the cars on coming together would first cause the coupling hooks 14 to engage, and their beveled surfaces sliding upon each other would force the coupler hooks 14 apart against the action of spring 16, until the normal coupling relation is secured, when the action of the spring 16 would force the coupling hooks 14 into engaging relation, as shown in Fig. 2, when the cars would be mechanically coupled together. This movement of one or the other of the cars would obviously bring the casings 22, containing the electric contacting devices, in juxtaposition, so that the live contactors 33 would immediately engage and the contactors 35 would also be brought into a normal or engaging relation. At the same time that the car couplers 13 are brought into engaging relation, it will be obvious that the reservoir and brake line connections 50 and 51 would be connected through the couplers. The trainman or operator would obviously, at the time the cars come together, be in the cab of one or the other of the cars adjacent the controlling mechanism consisting of the main control or main valve 52 and the other controlling devices to be presently referred to. The coupling devices on the two cars having been brought together, it will be seen that the parts are all in operative relation, except that the main electric circuits have not been coupled up, nor the fluid-pressure for operating the air brakes turned into the train lines through the coupling devices. This is accomplished by the trainman or operator from the cab of either car (having established pressure in its reservoir line) operating the on-air-valve, the operating lever of which is designated by the reference character 53. It will be apparent that the pressure on the reservoir lines 50 will extend throughout said pipe line up to the main valve 52, and through the connecting branch line 54 to the auxiliary line containing the on-valve 53. When the operator, by pressing downwardly on the lever of on-valve 53, opens this valve, he admits the pressure into the line 55 and brake line 51 through the couplers and thence through the branch lines 56 which lead to the on-cylinders 52ª of the main valves in both cars. In this cylinder 52ª the pressure of the air will move the double piston valve 52ᵇ to the position shown in Fig. 5. Connected with the shaft of the double piston 52ᵇ is the slotted lever 52ᶜ, in engagement with pin 52ᵈ on the shaft, so that reciprocation of the double piston will rock the lever 52ᶜ and the valve shaft 52ᵉ in engagement therewith about a quarter of a revolution. Connected with the valve shaft 52ᵉ are the two main valves 52ᶠ and 52ᵍ, so that the rocking movement of the shaft 52ᵉ to the position shown, for example, in Fig. 5, will result in opening the main valves controlling both the brake line pipes and the reservoir line pipes in each car. This movement will permit the reservoir line pressure to pass beyond the main controlling valve and enter the reservoir line 50 leading downwardly from this valve mechanism into the bottom of the swiveled connection 21 of the car coupling devices or draw heads, which lines pass thence through the swiveled connection through similar pipes 50 leading from the swiveled connection along the under side of the draw bars, thence upwardly, where they have suitable terminals in the engaging faces of the draw bar, where fluid pipe connections are made with the corresponding reservoir line on the opposite coupler.

In order to more readily trace the pipe line connections and understand the operation of the system, attention will be directed solely to the operation of the various devices in the trainman's or operator's car. The operation of the main controlling valve 52, it will be seen, not only opens the reservoir line leading through this valve to the reservoir line terminal connection in the coupler head, but since a portion of this valve is interposed in the brake line for controlling it as well, the operation of the valve 52 operating the main valves in both brake line and reservoir line systems, which portions of the main valve have been designated by the reference characters 52ᶠ and 52ᵍ, the pressure will pass from the brake line 51 leading from the car into the depending portion of the brake line 51 leading to the couplers 13; and this brake line pressure will be admitted through the brake line pipe 51, which parallels the train line pipe on the under side of the draw bar in the embodiment of the invention shown in Fig. 1 and passes thence upwardly into the draw bar and to its terminal in the forward face of the draw bar, where it is connected with the brake line 51 on the opposite car. The passing of the pressure through the controlling valve 52 into the terminal portions of the reservoir line 50 of the operator's car will first have the effect of raising the pressure in the branch lines 60 and 61, the former of which leads into a cylinder 62 in the draw bar 13 and behind a piston therein, whose function when withdrawn, by the pressure from the branch pipe 97, to the rearmost extremity of the cylinder 62, is to withdraw the piston rod 63, shown in Figs. 2 and 3, in order that its withdrawal may, through the connected flexible chain 64, rock the pivoted lever 17 to uncouple the hooked coupling devices 14 of the car coupler. It should be carefully noted, however, that the function of the branch pipe 60 leading from the reservoir line 50 is entirely independent of any uncoupling operation, but this pipe enters the cylinder behind the piston and serves merely to plug the piston in its inoperative position, in which it permits the coupling hooks 14 to remain in engaging relation. This is an important feature of the invention and is a safety device, the complete operation of which will be described later.

The branch pipe 61 leading also from the reservoir line 50 enters the cylinders 24 behind the piston 65 therein, and pressure thus applied in this cylinder serves to operate the plungers 26 against the action of the springs 66 to cause the electric coupler heads carrying the plugs 27 and 29 to be moved forwardly in the casings 22, so that the plugs 27 will enter their corresponding sockets 38, closing the electrical circuits through the contactors 35 on each car already in engagement; and it will be seen that when the electric coupler plungers on both cars have been operated, as they will be operated almost synchronously, the electric circuit connections will be established between the cars in addition to the previous mechanical coupling of the cars, and the air pressure on both the reservoir lines and the brake lines will now have been established between the two cars. It remains, however, to note the effect of the transmission of the pressure from the brake line and reservoir line of the operator's car into the corresponding brake and reservoir lines in the opposite car. We have already noted that the pressure on the reservoir line being established in the opposite car, the uncoupling cylinder thereof will also be plugged by air passing through branch pipe 60, and the electrical connections will be established by the operation of the piston in cylinder 24 through the branch pipe 61. It will be obvious that the air pressure will continue in the brake line 51 through the swiveled connection of the coupler head on the opposite car, and will pass thence upwardly to the main control or triple valve 52 in the opposite car. It will be noted that the pipe lines 55 leading from the on-valves 53 in both cars are also connected with the brake lines 51 in each car. Therefore, it will be seen that when pressure in the brake line 51 on the opposite car is established beyond the coupling devices, pressure will be built up in the branch pipe 55, which will be communicated to the branch pipe 56 which is in communication with the main control or triple valve mechanism 52 in the manner already described. The result of this construction is that when the cars are mechanically coupled and the operator in one of the cars operates the main valve 52, the pressure thus turned into the brake line 51 between the controlling devices on the ends of the two cars will become immediately effective to move the piston $52^b$ in the opposite car at about the same time that the piston $52^b$ is moved on the car in which the operator is stationed, so that the main control or triple valves 52 in both cars will be operated synchronously, or nearly so, when the cars are in coupling relation, when the operator opens the on-valve in either car. It will be apparent, therefore, that with two cars equipped with the improved car, air and electric coupling devices of the character above described, it will be only necessary for the operator, in order to effect the complete air and electric coupling of the two cars, to operate the on-valve 53 in the car in which the pressure has already been built up in the reservoir and the reservoir line.

In order that the trainman or operator may know that the air and electric coupling devices have been operated, indicating means is preferably provided to show the position of the main control valve mechanism 52. In Fig. 5, the casing of the controlling plunger $52^b$ for the valve is shown provided with binding posts insulated therefrom, which serve as terminals for the wiring connections 68 and 69, in which circuit as shown in Fig. 1 is interposed the electric signal lamps 67, the circuit being energized by a battery as indicated at 74. The binding posts in the casing $52^a$ are provided with spring terminals 70 and 71, normally separated but adapted to be brought into engagement to close the circuit by a block or projection 72 secured by screw 73 to the plunger rod $52^b$. By this construction, it will be seen that the electric circuit 68, 69 will be closed and the lamp 67 lighted whenever the piston $52^b$ is moved to the position shown for example in Fig. 5, and the controlling valve mechanism is operated to couple the air and electric connections between the cars. If care be taken to place the signal lights 67 in a position where they may be observed from the trainman's position on both cars, it will be seen that he will be apprised when the lights appear on both cars that both the controlling valves 52 have operated.

Having now described the complete operation of coupling cars with respect to the fluid and electrical connections as well as the mechanical coupling, the operation of the device in uncoupling and a description of the means employed will now be given.

Reference has already been made to the cylinder 62 and the piston 63 therein for operating the car coupling devices in order to cause the coupler hooks 14 to separate in uncoupling. Interposed between the reservoir line 50 in each car and the housing of the control valve operating piston $52^b$ is an auxiliary reservoir line or pipe $50^a$. This pipe $50^a$ is shown in detail where it enters the valve housing $52^x$, in Fig. 5. This portion of the valve housing is a sort of supplementary housing at the outer end of the off cylinder of the housing and is specifically designated by the reference character $52^x$. The outlet of the pipe $50^a$ in the housing $52^x$ is through a reduced passageway leading into the extremity of the off cylinder behind the piston in that cylinder. This reduced opening is designated by the reference character $52^y$ and is adapted to be closed by a spring valve $52^z$ seated against a shoulder in the passage and held normally in position to close the opening into the off cylinder by a coil spring $52^m$ interposed between the valve and a screw plug $52^n$ or other part on or connected to the housing. A convenient construction is that illustrated in Fig. 5, in which the normal opening in the housing is closed by a plug $52^p$ which is pierced vertically by the reduced opening $52^y$ and by an extension of this opening extending at right angles thereto and communicating with an opening passing into the off cylinder behind the piston therein. The auxiliary housing $52^x$ is preferably extended downwardly and considerably enlarged to contain an electrical solenoid, the coil of which is indicated at $52^q$, and a movable plunger extending vertically through the center thereof at $52^r$. This plunger has its upper extremity in the form of a valve adapted to seat against a suitably formed portion in the plug $52^p$ and at the lower extremity thereof. Below the plug $52^p$ in the housing is an enlarged cavity around the upper extremity of the plunger bar $52^r$, and from this cavity or chamber there is a vent as indicated at $52^s$ leading to the atmosphere. There is a small pin or shaft $52^t$ interposed between the valve on the upper extremity of the plunger bar $52^r$ and the lower extremity of the spring-controlled valve $52^z$. The armature $52^{a'}$ has a downwardly projecting portion $52^u$ which projects below the lower extremity of the housing $52^x$, and it will be seen that if the electrical solenoid should for any reason prove ineffective in operating the armature to admit pressure from the auxiliary reservoir line 50ª to the main valve operating piston 52ᵇ, the trainman might manually elevate the plunger bar 52ʳ, which normally is adapted to be operated by the solenoid, and the same result would be obtained; that is, the elevation of the upper or valve end of the plunger bar 52ʳ would close the opening in the lower end of the plug 52ᵖ and by contact with the stem 52ᵗ would open the valve 52ᶻ against the action of spring 52ᵐ and permit the pressure from the auxiliary air line 50ª to enter behind the piston 52ᵇ and cause it to be moved to the opposite extremity of the casing from that indicated in Fig. 5, which would result in giving the triple or controlling valves each about a quarter turn, which would close the valve in the reservoir line 50 and would also close that portion of the valve controlling the brake line 51. Any suitable electrical means may be provided for energizing the solenoid 52ᵠ. In the present embodiment of the invention as particularly shown in Fig. 1, the battery 74 is utilized for this purpose and the circuit traced therefrom to the solenoid is from the battery by way of the wire 80, through contact 81 of the off-switch, the button of which is indicated at 82, the wire 83 into the binding post of the solenoid 52ᵠ, thence through the solenoid and wire 84 into the cable 23, thence through the electrical multiple connectors in constant engagement as indicated at 33 in the drawing Fig. 7, thence out of cable 23 on companion coupler through wire 85 to the binding post of the solenoid 52ᵠ on the opposite car, thence out of the solenoid through wire 86 to the off-switch 82 on car A, thence through contact 87, wires 88 and 89 to the truck of wheels 12, by which it is grounded through the rail 11 to the truck on car B, whence the circuit may be traced along the corresponding wiring similarly designated as 89, back to the battery 74 on the car in which the operator is stationed. It will be obvious that if the trainman or operator be stationed in the opposite car, the closing of the off-switch 82 will energize the solenoids in both cars in the same manner, and the circuits in either direction may be traced through the corresponding wiring similarly designated. The off-switch lever and button 82 are controlled by suitable elastic means, as the compression coil spring 90, by which the switch is normally held against the contact 87, and it will be seen that when the operator presses the off-switch button 82 and operates the switch lever to a position where the switch is in contact with the terminal 81, the contact will remain unbroken only so long as the operator maintains the off button and switch against the pressure of the return spring. The operation of the solenoid plunger 52ʳ, in so far as its effect on the movements of the main valve is concerned, will be the same whether operated manually or by the solenoid mechanism just described.

From the preceding description it will be seen that by the electrical or hand manipulation of valve 52ᶻ reservoir pressure to operate the main valve to the off position will be admitted into the off cylinder 52ᵈʳ behind the piston therein to operate piston rod 52ᵇ. It will also be noted that brakeline pressure will be effective whenever the valves are opened in cylinder 52ª, and therefore provision must be made for operating the piston in the off cylinder against this brakeline pressure in cylinder 52ª. This is accomplished, as illustrated in Fig. 5, by making the off cylinder and its corresponding piston of considerably larger diameter than the on cylinder and piston, so that the area in compression being greater in the off cylinder this cylinder will be effective to overcome a like pressure in the on cylinder. Whenever the valve 52ᶻ is permitted to close the pressure within the off cylinder will vent at 52ˢ. By this improved construction it will be seen that the main control valve will be operated to the on or off position by a common reservoir pressure.

From the above description of the mechanism connected with the off-button 82, it will be seen that when the operator presses this button the effect will be to close the control valves in both the reservoir and brake line terminals in both cars simultaneously. The closing of the controlling valves in the manner described will break the switch connections between the contacts 70 and 71, and will cut out the signal lights 67 in both cars upon the shifting of the control valve 52ᵇ, which will indicate to the operator that these valves have been closed. The closing of the control valves 52ᶠ and 52ᵍ, which operation occurs simultaneously, will have the effect of shifting the main passage of the valve 52ᶠ to a position where it will be in communication with the vent 52ʰ leading to the atmosphere through the wall of the casing. This will allow the pressure in the reservoir line between the control valves on each of the two cars and the coupling devices to escape through the angular vent 52ⁱ in the valve 52ᶠ from between the main valves on each of the two cars, this pressure escaping to the atmosphere through the vent 52ʰ described. Thus it will be seen that when the off-switch 82 is operated by the trainman or operator in either of the two coupled cars, the effect of the electric connections will be not only to operate the control valves to their closed position, but the venting of the reservoir lines between these valves in each car will exhaust the pressure not only in these lines but in the auxiliary connections or pipes 60 and 61, the former of which, as described, plugs the car coupler operating cylinder and the latter of which is designed normally to maintain the plungers carrying the electric coupling devices in their contacting or operative positions, to which position they are moved by compressing the return coil spring 66 referred to. It will be apparent, therefore, that the venting of the reservoir line connections between the controlling valves in the two cars will release the pressure in these auxiliary pipes 60 and 61, which will remove the plugging effect upon the car uncoupling cylinder and will also relieve the pressure behind the piston operating the plunger carrying the electrical connections, so that this piston will be returned by the action of spring 66 to its retracted position, breaking all of the electrical connections in each of the electrical connectors on both cars with the exception of the contact plugs 33. Although at this time the electrical connections, with the exception of the secondary circuits, will have been broken, it yet remains to operate the car couplers, which may now be done by operating the uncoupling valve 95, which will permit air from the reservoir line 50, through the connection 54, through pipe 96 into the main valve 52. The operation of the main valve 52$^t$ to bring the valve to closed position following the operation of the off buttons 82 controlling the solenoid circuits, will have the effect of opening the interlocking valve 52$^{t'}$, admitting air through the pipe 96 into pipe 97 which enters the piston cylinder 62 on the forward side of the piston and causes the piston rod 63 to be moved toward the rear end of the cylinder and thus operating the car uncoupling cam 18, which will separate both the hooked coupling devices 14 against the action of their retaining springs 16, and will permit them to separate and hence permit the separation of the couplers and the mechanical uncoupling of the cars. It will be seen that the operation of the uncoupling lever 95 in either of the cars following the disconnection of the electrical connections under control of push button 82 in that car, will be sufficient to move the coupling hooks in both the cars without the necessity for operating the off-lever in the opposite car. But it will also be obvious that the mechanism described is so arranged that it will be impossible for the operator to operate the off air valve and so disconnect the car couplers before disconnecting the electrical coupling devices, for the reason that the operation of the uncoupling lever 95 prior to the operation of the off electric push-button 82 would merely result in admitting air pressure from the reservoir line into the pipe 96, but the position of the main valve would block the pressure until the main valve is operated to its closed position with respect to the brake line and the reservoir line. It will also be seen that the branch line 60 leading from the reservoir line system will admit pressure from the reservoir line behind the pistons operating the uncoupling devices whenever the pressure is admitted through the reservoir line branches 61 to force the electrical connecting devices in circuit. This is an important feature of the invention, insuring that the mechanical uncoupling devices will not permit the separation of the cars while the main electrical circuits are closed, for separation of the cars under such conditions would result in destructive arcing between live connections carrying circuits of high potential.

In Fig. 1, the reservoir line systems 50 and the brake line systems 51 are shown connected by the usual trainman's or service valve 100, which may be operated through levers 101 in the application of the service brakes, in the manner common in this art.

In order to provide means by which an operator may, if desired, couple or uncouple the cars while he is located on the ground near the coupling mechanism of the cars, I show means consisting of two additional valves 102 and 103, which are provided for this purpose and which may be positioned as indicated under the platform of each end of each car. To prevent complicating the drawings, I have shown these parts only on the under platform of car B, Fig. 1. The operation of these additional valves will accomplish the same results as the valves 53, 95, and the switch button 82, all of which have been heretofore described. It is shown in Fig. 9 how the electric button switch 82 may be combined with a valve mechanism so that the operations of these parts will correspond to the combined operations of valve 95 and switch 82.

Should it be desired to perform the coupling of the cars A and B from the ground, the trainman, after the mechanical couplers 13 are in coupled position, will press the button or operating lever of the on-valve 102, which will allow the pressure in the reservoir line 50 in the car in which a pressure has been established, to escape through the pipe 104, valve 102 and pipe 105 into the brake line 51 between the main valves 52. This will build up a pressure in the brake lines 51 and pipes 55, 56, operating the valves 52 to their on-position, as heretofore described, by the operation of valve 53 from the cab of the car.

When it is desired to uncouple the cars A and B, the button or lever 106 of the off-valve 103 is pressed by a trainman from a position on the ground, forcing down the stem 107 (Fig. 9), causing the spring 108 to press down the insulated plate or contact disk 109 onto the contactors 110, thus completing the circuit between the wires 80' and 83'. This will energize the solenoid 52ª and turn off the valve 52 in the same manner that the bottom switch 82, as heretofore described, accomplishes the closing of the main valves from the cab of the car.

In addition to closing the circuit through the battery and the solenoids 52ª, in the cab of each car, the combination valve 103 also operates the piston in the uncoupling cylinder 62, in the same manner as described above by the operation of valve 95.

As the button 106 of the valve 103 is pressed down, the valve stem 111 being also forced downwardly opens the valve 112, uncovering its seat and allowing the pressure in the reservoir line 50 of car B to pass through the pipes 113 and 114, up to the connection in the pipe 96 through the valve opening 52'', down pipe 97 and into the forward end of the uncoupling cylinder 62, forcing the same backward against the action of the spring shown therein and operating the cam 18 which separates the coupler hooks 14, thus disconnecting the mechanical coupling devices.

In practice, the main valves 52, together with their piping, will be placed in an out-of-the-way place, as in the car body or under a seat in the car. The off-valves 53, 95 and the push switch 82, together with the signal lights 67, would be placed in the cab at each end of the cars where they would be convenient for manipulation and inspection.

While the signal system shown specifically in Fig. 1 and heretofore described is of simple construction and offers the advantage of indicating at once to the operator's eye which main valve has failed to work, the operator may become careless and only observe that one light is on, failing to look at the condition of the signal light in the companion car, and thus fail to observe that the companion light is off and wrongly assume that both main valves have been operated.

To overcome this carelessness on the part of the operator, two modified signal systems are shown in Figs. 10 and 11, the views in both these figures being diagrammatic. In Fig. 10 the signal lights 67 on each car are connected in series and the three-way switches 115 placed in the cabs of each car are for the purpose of testing out the lights to indicate if the main or control valves in each car are in their proper positions. The switches 115, as shown in Fig. 10, are in what may be termed the testing-out position. By tracing the circuit when the switches 115 are in the positions shown in Fig. 10, it will be found that the current will flow from battery 74 on the car B, through wire 89, rail 11, up the wire 89 on car A, down wire 118 on car A, to the point 116 of switch 115, through switch 115, wire 69', light 67, wire 69, spring contacts 70 and 71 of the main valves, through wire 68, into the cable 23 of the electrical coupler 22, through similar contactors of coupler 22 as shown at 23, 34, 30, 32 and 33, Fig. 7, then out of cable 23 of car B, up wire 68, through spring contacts 71 and 70, wire 69, light 67, wire 69', switch 115 on car B, up wire 119, and thence to the battery 74, completing the circuit.

Should it be desired to turn off the lights after making a test out, rather than to allow the lights to burn constantly when the cars are in coupling relation, the operator, should he be in car A, would shift the switch 115 from contact point 116 to contact point 117, which would connect the batteries 74 in opposition to each other, and no current would flow.

After shifting the switch 115 of car A, to contact point 117, as described above, the operator may if desired test out the position of the valves 52 while in the car B by shifting the switch 115 of car B to the contact point 116. This will reverse the flow of current through the circuit, but instead of taking current from the battery 74 of car B the current will be taken from the battery of car A. When the operator is through testing out in car B, he should, in order to turn off the lights 67, shift the switch 115 of car B back to the contact point 117.

Fig. 11 is a diagrammatic view of a modified form of signal system, wherein the signal systems of Fig. 1 and Fig. 10 are combined to utilize the advantageous features of each system in a single system.

In Fig. 11, the three-way switch 115 is interposed in the line 68 of cars A and B and having the contact point 117 connected with the wire 68' and the swivel point of switch 115 connected with the other point of wire 68 leading to the binding post of spring 71. When the switches 115 of cars A and B are in the position shown in Fig. 11, the two signal lights 67 are connected in series, but should both switches of cars A and B be shifted to the contact points 117 of each, the system will operate the same as described in that of Fig. 1, with the exception that I have additionally on each car a hand or push switch 119ᵇ. These switches 119ᵇ are normally held in contact with the terminals of wires 121, which latter wires are for the purpose of shunting the batteries 74. The object of the spring switch 119 is to automatically turn off the lights 67 after they have been tested out in the manner described. This system, as shown in Fig. 11, having the spring switch 119ᵇ, makes it necessary for the operator to press the button or operating member of switch 119ᵇ in order to test out the position of the main valves 52. This system, however, has the advantage of automatically turning off the lights 67, which may be a desirable feature under some conditions.

Having the switches 115 in the positions shown in Fig. 11, if the operator should desire to make a test by pressing the button of switch 119$^b$ in car A, and then finds that the lights 67 are not on, he would first shift switch 115 to contact point 117, all in car A, and again press the switch button 119$^b$. If the light 67 in car A should then show as burning, it would indicate at once that the trouble is in car B. On the other hand, if the light 67 in car A did not turn on when switch 119$^b$ is operated, it would indicate to the operator that the trouble is in car A, the main valve of which has not yet operated.

The pressing of switch 119$^b$ in car A would close the circuit from battery 74 of car A, when the current would flow through wire 89, rail 11, up wire 89 of car B, by way of wire 121, through the switch 119$^b$ of car B, through light 67, wire 69, spring contacts 70 and 71, wire 68, switch 115, down wire 68', through the cables 23 and the couplers 22 as already described, thence up wire 68' of car A to the terminal point 116, through switch 115, down wire 68, through springs 71 and 70, wire 69, light 67, through switch 119, and by way of wire 120, remembering the switch 119 is operated against spring 119$^a$, and thence to battery 74, completing the circuit. By pressing the switch 119 of car B, the current through the same circuit is reversed in both cars A and B, shunting the battery in car A and using the battery in car B.

In order that the invention might be understood, the details of the preferred embodiment have been shown and described, but it is not desired to be limited to the details shown, since it is apparent that persons skilled in the art may resort to various modifications and arrangements of the features shown and described without departing from the purpose and spirit of the invention.

What I claim is:

1. A system of train pipe coupling for two coöperating cars comprising a plurality of fluid-pressure connections through the coupling devices, means on each of the cars for controlling the fluid-pressure connections, and means whereby these connections on the two cars may be opened or closed by the operator from a station in either of the two coöperating cars.

2. The combination with a coupling device for cars comprising an interlocking device adapted to coöperate with a similar device on a companion car, a fluid pressure system and an electric system in each car, fluid and electric coupling devices associated with said car coupling device and adapted to coöperate with similar fluid and electric coupling devices on coöperating cars, controlling means for said car, fluid and electric coupling devices, comprising means for opening and closing the fluid-pressure system of the car in relation to the fluid-pressure coupling devices, and means for operating the car and electric coupling devices from the fluid pressure system.

3. In a coupling system for cars, the combination with a brake line and a reservoir line, of car coupling devices, coupling terminals for said brake line and reservoir line adjacent the car coupling devices, means for controlling the pressure from said brake line and said reservoir line to the coupling connections comprising an electrically operated pilot valve, a main controlling valve in each of said brake line and reservoir line, and a fluid-pressure operated valve controlling said main valve and under the control of the said pilot valve.

4. In a system of car, fluid pipe and electric coupling devices on two coöperating cars, the fluid pipe coupling connections being on the faces of the car couplers, means whereby the fluid pipe connections may be controlled on both of two coöperating cars by an operator from one of the cars, and means controlled by the operator for moving the car coupling devices to their operative or inoperative position, said means being actuated from the fluid pipe connections.

5. In a system of train pipe coupling devices on a plurality of coöperating cars, the combination with car coupling devices, of means whereby a plurality of fluid-pressure connections terminating in the faces of the coupling devices are controlled by the operator from one of the cars comprising controlling valves in each of the fluid-pressure connections, and means for operating said controlling valves synchronously in each of the fluid-pressure connections in each individual car.

6. A system of train pipe coupling devices on a plurality of coöperating cars comprising a plurality of fluid pressure connections and car and electric coupling devices between coöperating cars, controlling valves in each of the cars interposed in each of the fluid-pressure connections, means for operating said controlling valves in the fluid-pressure connections on each car synchronously comprising fluid-pressure operated devices, and electrically operated means for operating the last said devices, said means being under the control of an operator from his cab or station in either of the coöperating cars.

7. The combination with a coupling device for cars comprising an interlocking device adapted to coöperate with a similar device on a companion car, fluid and electric coupling devices associated with said car coupling device and adapted to coöperate with similar fluid and electric coupling devices on coöperating cars, controlling means for said car, fluid, and electric coupling devices comprising means for opening and closing the fluid-pressure system of the car in relation to the fluid-pressure coupling devices, fluid-pressure operated means for operating the last said means, an electrically operated valve for controlling the fluid-pressure operating means, and means under the control of an operator from his cab or station in either of two companion cars for opening and closing the said electrically operated valve.

8. A system of train pipe coupling for two coöperating cars comprising a plurality of fluid connections through the coupling devices, devices on each of the cars for controlling the fluid connections, and means whereby said controlling devices on the two cars may be opened or closed by the operator from a station in either of the two coöperating cars.

9. The combination with a coupling device for cars comprising an interlocking device adapted to coöperate with a similar device on a companion car, of fluid and electric coupling devices associated with said car coupling device and adapted to coöperate with similar fluid and electric coupling devices on coöperating cars, controlling means for the said car, fluid and electric coupling devices, comprising valve mechanism for opening and closing the fluid-pressure system of the car in relation to the fluid-pressure coupling devices, electro-pneumatically operated means for controlling the said valve mechanism, and means for operating the car and electric coupling devices from the fluid-pressure system.

10. In a system of train pipe coupling devices on two coöperating cars, comprising a fluid pressure line, the combination with valve mechanism for controlling the pressure in said line, means for operating the said valve mechanisms on both cars to the open position by the bringing up of the pressure in the line between said valve mechanisms, and means for admitting the fluid pressure from a suitable source of pressure supply to the line between said valve mechanism all under control of an operator in either of the cars.

11. In a system of train pipe coupling devices on two coöperating cars comprising a fluid pressure line, the combination with valve mechanism for controlling the pressure in said line, means for operating the said valve mechanisms on both cars to the open position by the bringing up of the pressure in the line between said valve mechanisms, means for admitting fluid pressure from the source of fluid pressure supply to the line between said valve mechanisms by an operator stationed in either of the cars, and means also operable by an operator from a station in each of the cars for closing said valve mechanisms in both cars by admitting fluid pressure from the source of fluid pressure supply.

In testimony whereof I have signed my name to this specification, in the presence of two subscribing witnesses, on this 25th day of Feb., A. D. 1914.

CHARLES H. TOMLINSON.

Witnesses:
EDWARD F. WICKWIRE,
A. LYMAN PRICE.